(12) United States Patent
Sells (10) Patent No.: US 8,614,874 B2
(45) Date of Patent: *Dec. 24, 2013

(54) BIASED MOSFET ACTIVE BRIDGE WITH ACTIVE GATE DRIVE

(75) Inventor: Troy Woodrow Sells, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 601 days.

This patent is subject to a terminal disclaimer.

(21) Appl. No.: 12/491,285

(22) Filed: Jun. 25, 2009

(65) Prior Publication Data

US 2009/0273959 A1    Nov. 5, 2009

Related U.S. Application Data

(63) Continuation-in-part of application No. 11/285,566, filed on Nov. 22, 2005, now Pat. No. 7,561,404.

(51) Int. Cl.
*H02H 11/00* (2006.01)
(52) U.S. Cl.
USPC ............................................ 361/246; 363/89
(58) Field of Classification Search
USPC .................. 363/81, 127, 89; 361/246
See application file for complete search history.

(56) References Cited

U.S. PATENT DOCUMENTS

| | | |
|---|---|---|
| 4,139,880 A | 2/1979 | Ulmer et al. |
| 4,423,456 A | 12/1983 | Zaidenweber |
| 4,447,868 A | 5/1984 | Turnbull |
| 4,449,176 A | 5/1984 | Turnbull |
| 4,774,650 A | 9/1988 | Kahkipuro et al. |
| 4,825,351 A | 4/1989 | Uesugi |
| 5,268,833 A | 12/1993 | Axer |
| 5,510,972 A | 4/1996 | Wong |
| 5,623,550 A | 4/1997 | Killion |
| 5,648,705 A | 7/1997 | Sitar et al. |
| 5,793,167 A | 8/1998 | Liang et al. |
| 5,808,882 A | 9/1998 | Mochikawa |
| 5,870,031 A | 2/1999 | Kaiser et al. |
| 5,991,182 A | 11/1999 | Novac et al. |
| 6,147,545 A | 11/2000 | Marshall |

(Continued)

FOREIGN PATENT DOCUMENTS

| | | |
|---|---|---|
| EP | 1519476 | 3/2005 |
| WO | WO-97/24795 | 7/1997 |

OTHER PUBLICATIONS

Paul Horowitz, The Art of Electronics, 2006, The Press Syndicate of the University of Cambridge, Second Edition, 229-230.*

(Continued)

*Primary Examiner* — Rexford Barnie
*Assistant Examiner* — Tien Mai
(74) *Attorney, Agent, or Firm* — Fox Rothschild, LLP (57) ABSTRACT

A transistor active bridge circuit (100) including first and second field-effect transistors (102, 104) of a first channel type, and third and fourth field-effect transistors (106, 108) of a second channel type that is different from the first channel type. The transistor active bridge circuit also includes a plurality of gate drive circuits for the field-effect transistors. A set of voltage dividers (110/112, 114/116, 118/120, 122/124) and/or voltage clamping devices (126, 128, 130, 132) permit the circuit (100) to efficiently operate over a wider range of input voltages, without potential damage to the gate drive circuits.

3 Claims, 11 Drawing Sheets

(56) References Cited

U.S. PATENT DOCUMENTS

| | | |
|---|---|---|
| 6,215,271 B1 | 4/2001 | Lerow et al. |
| 6,320,448 B1 * | 11/2001 | Gantioler .................. 327/423 |
| 6,353,307 B1 | 3/2002 | Koelle et al. |
| 6,421,261 B1 | 7/2002 | Fujisawa et al. |
| 6,549,438 B2 | 4/2003 | Malone |
| 6,563,726 B1 | 5/2003 | Hirst |
| 6,661,208 B2 | 12/2003 | Rutter et al. |
| 7,084,609 B2 | 8/2006 | Pillote et al. |
| 7,269,038 B2 | 9/2007 | Shekhawat et al. |
| 7,292,445 B2 | 11/2007 | Linke |
| 7,339,804 B2 | 3/2008 | Uchida |
| 7,388,404 B1 | 6/2008 | Miller |
| 7,411,768 B2 | 8/2008 | Sells |
| 7,420,224 B2 | 9/2008 | Milich et al. |
| 7,443,142 B2 | 10/2008 | O'Gorman et al. |
| 7,478,254 B2 | 1/2009 | Kawai |
| 7,561,404 B2 | 7/2009 | Sells |
| 7,920,393 B2 | 4/2011 | Bendre et al. |
| 8,045,350 B2 * | 10/2011 | Sells .................. 363/81 |
| 2003/0095423 A1 | 5/2003 | Hirst |
| 2005/0024033 A1 * | 2/2005 | Nakata .................. 323/282 |
| 2007/0170903 A1 | 7/2007 | Apfel |
| 2007/0171690 A1 | 7/2007 | Apfel |
| 2007/0296363 A1 | 12/2007 | Andrejak et al. |
| 2008/0291699 A1 | 11/2008 | Sells |
| 2010/0046259 A1 | 2/2010 | Ho et al. |
| 2010/0046264 A1 | 2/2010 | Ho et al. |

OTHER PUBLICATIONS

European Search Report mailed May 3, 2011, European Application No. 10015390.7-2207.

* cited by examiner

— — — Input Voltage Waveform for gate driver circuit 200 of FIG. 2A

■ ■ ■ ■ Output Voltage Waveform for gate driver circuit 200 of FIG. 2A

Time (ms)

FIG. 6

— — — Input Voltage Waveform for gate driver circuit 290 of FIG. 2B

■ ■ ■ ■ Output Voltage Waveform for gate driver circuit 290 of FIG. 2B

Time (ms)

BIASED MOSFET ACTIVE BRIDGE WITH ACTIVE GATE DRIVE

CROSS-REFERENCE TO RELATED APPLICATION

This application is a continuation-in-part application of U.S. Ser. No. 11/285,566 filed on Nov. 22, 2005.

BACKGROUND OF THE INVENTION

1. Statement of the Technical Field

The inventive arrangements relate to Metal-Oxide-Semiconductor Field-Effect Transistor (MOSFET) circuits, and more particularly to a circuit for Alternating Current (AC) voltage rectification.

2. Description of the Related Art

Figure 11:
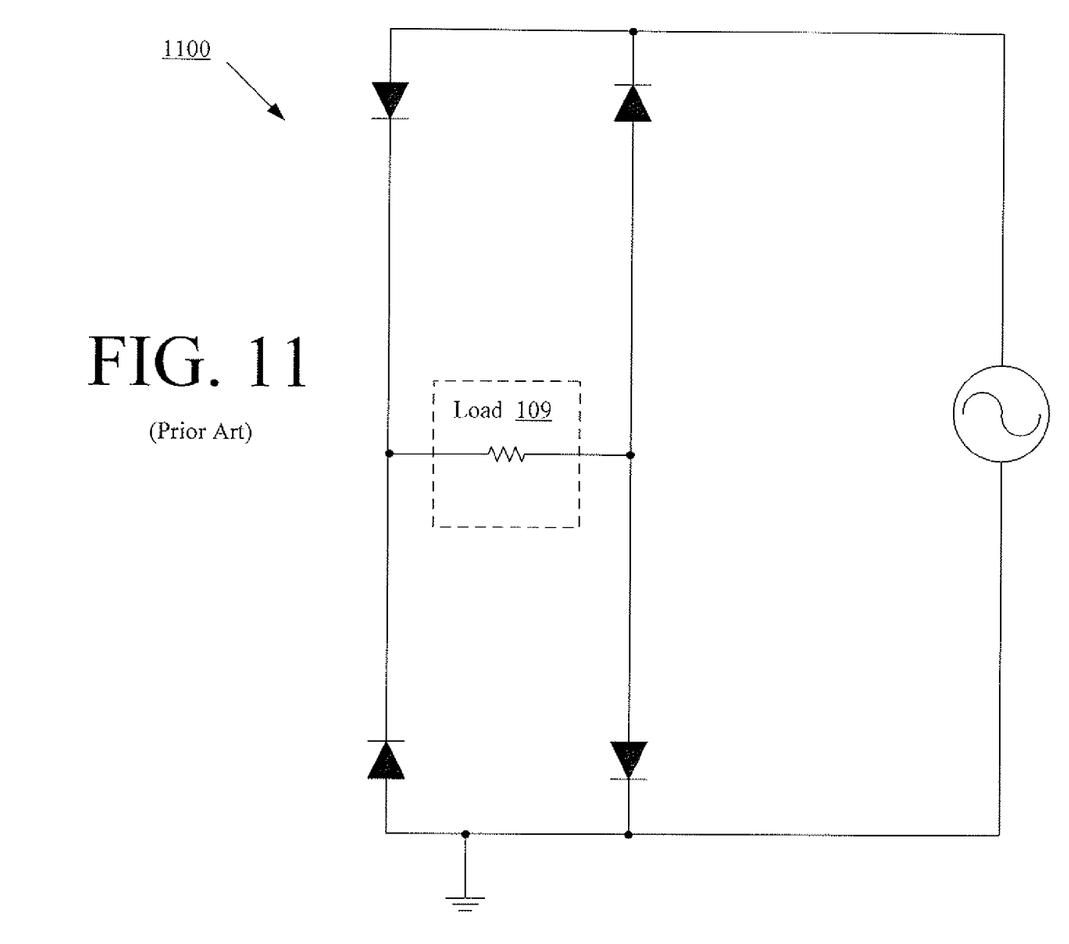
FIG. 11 is a schematic illustration of a conventional diode bridge rectifier circuit.

Bridge rectifier type devices are typically used to convert an AC waveform into a Direct Current (DC) waveform. A schematic illustration of a conventional bridge rectifier type device is shown in FIG. 11. The bridge rectifier type devices are supplied an AC voltage. Such bridge rectifier type devices often utilize a plurality of bridge connected diodes to perform the rectification function. The bridge connected diodes include two (2) positive side diodes and two (2) negative side diodes. During operation, only those diodes belonging to the phases indicative of peak values of the AC voltages at the respective positive and negative sides are turned on. In effect, an AC waveform is rectified by the bridge rectifier circuit. After the AC waveform is rectified, the output signal is often filtered to remove unwanted spectral content and to produce a DC voltage. A filtering device utilizing capacitor components, resistor components, and/or inductor components are typically used for this purpose.

Despite the various technologies known in the art, there remains a need for a MOSFET bridge rectifier type device that can rectify domestic AC mains (for example, 120V, 60 Hz) and/or foreign AC mains (for example, 230V, 50 Hz) with low power loss.

SUMMARY OF THE INVENTION

Embodiments of the present invention concern discrete transistor active bridge circuits. The transistor active bridge circuits are connectable between a pair of input lines and a pair of output lines. Each of the transistor active bridge circuits includes first, second, third and fourth field-effect transistors. The first and second field-effect transistors are of a first channel type. The third and fourth field-effect transistors are of a second channel type different from the first channel type. A source-drain path of the first field-effect transistor is connected in series with a source-drain path of the second field-effect transistor to form a first series transistor combination connected across the input lines. A source-drain path of the third field-effect transistor connected in series with a source-drain path of the fourth field-effect transistor to form a second series transistor combination connected across the input lines. The first, second, third and fourth field-effect transistors are connected to automatically convert an AC waveform to a DC waveform. The AC waveform is applied to the discrete transistor active bridge circuit by a voltage source coupled to the pair of input lines.

Each of the transistor active bridge circuits also includes a plurality of gate drive circuits. The gate drive circuits are configured to supply a voltage to the gates of the field-effect transistors for switching the field-effect transistors to their "on" states or "off" states at certain times. Each of the gate drive circuits has an input terminal coupled to a source of a respective field-effect transistor and an output terminal connected to a gate of the respective field-effect transistor.

Each of the gate drive circuits can include, but is not limited to, a level detector circuit. The level detector circuit is generally configured to provide a gate control output signal for each field-effect transistor to selectively switch the field-effect transistor between its "on" state and its "off" state. Each gate drive circuit can further include a resistor connected between an output terminal of the level detector circuit and a positive power supply terminal of the level detector circuit. Each gate drive circuit can further include a gate driver device that is excited by the level detector circuit. The gate driver device is generally configured for driving the field-effect transistor by supplying a voltage having an "on state" voltage value to the gate of the field-effect transistor.

Each of the transistor active bridge circuits can further include a voltage divider and/or a voltage clamping device for each of the field-effect transistors. The voltage divider can include a first resistor and a second resistor. The first resistor is connected between a source of the respective field-effect transistor and an input terminal of a respective gate drive circuit. The second resistor is connected in series with the first resistor from the source of the respective field-effect transistor directly to a first input line of the input lines. The first input line has a first voltage polarity opposite a second voltage polarity of a second input line of the input lines. The second input line is directly coupled to a drain of the respective field-effect transistor.

Each of the voltage clamping devices is respectively connected between the input terminal of the respective gate drive circuit and the source of the respective field-effect transistor. Each of the voltage clamping devices performs a dual function of (a) providing protection to the respective gate drive circuit, and (b) allowing a desirable voltage level to be developed between the input terminal of the respective gate drive circuit and the source of the respective field-effect transistor when a voltage across said input lines is less than a predetermined value. Each of the voltage clamping devices can be, but is not limited to, a zener diode connected between an input terminal of the respective gate drive circuit and a source of the respective field-effect transistor.

DETAILED DESCRIPTION

Figure 1:
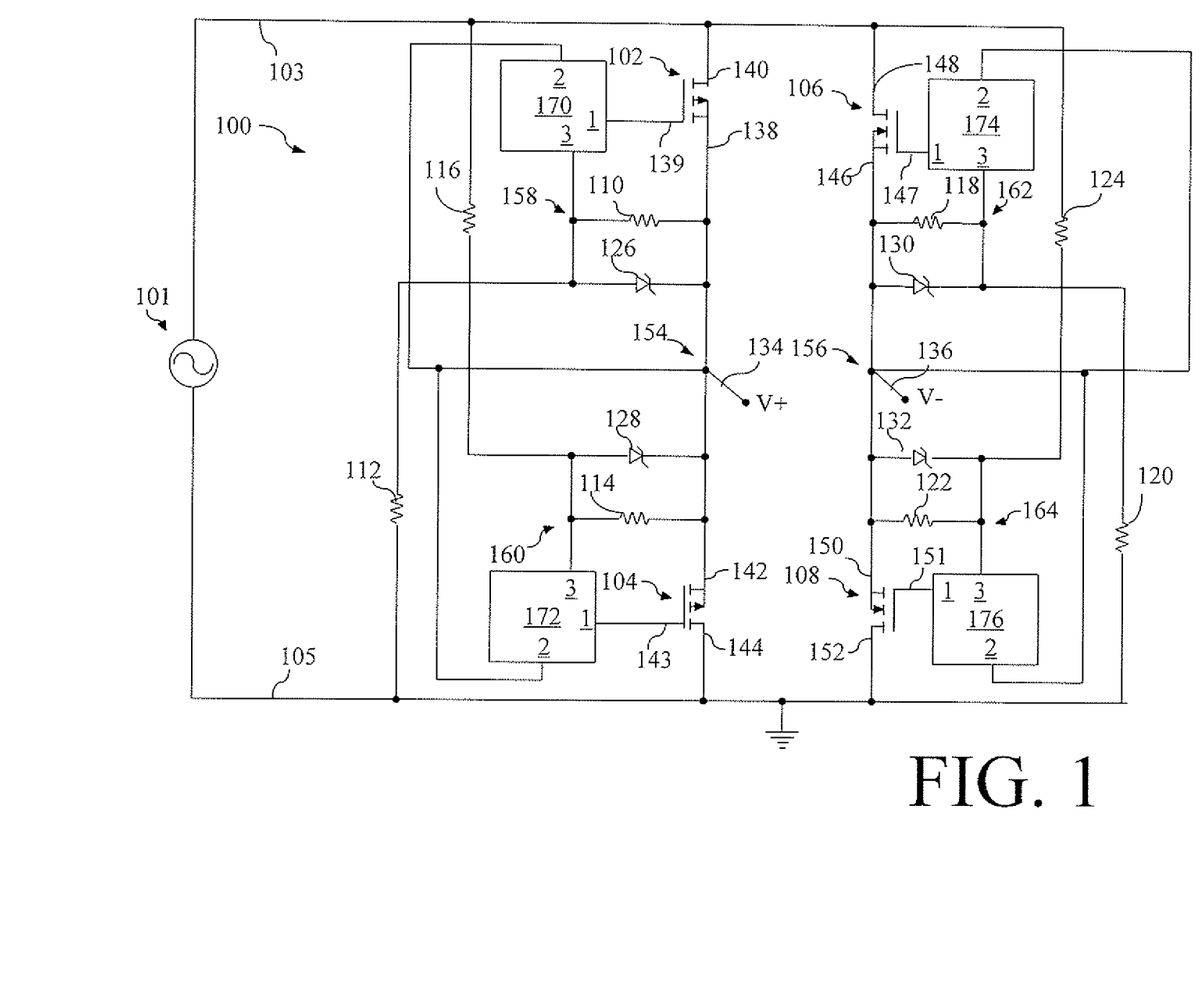
FIG. 1 is a schematic representation of a transistor active bridge circuit with active gate drive.
Figure 4:
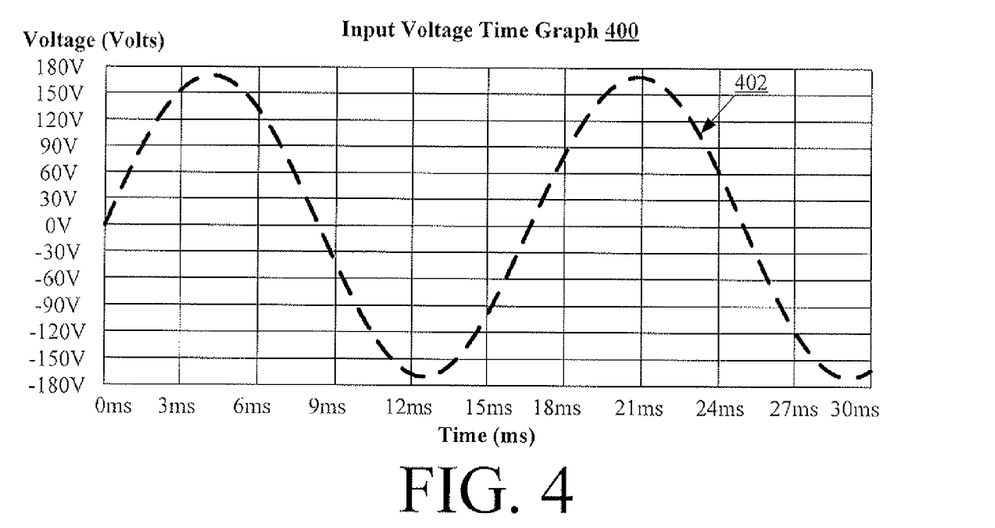
FIG. 4 is an input voltage time graph showing an exemplary input voltage waveform supplied to the transistor active bridge circuit of FIG. 1.
Figure 5:
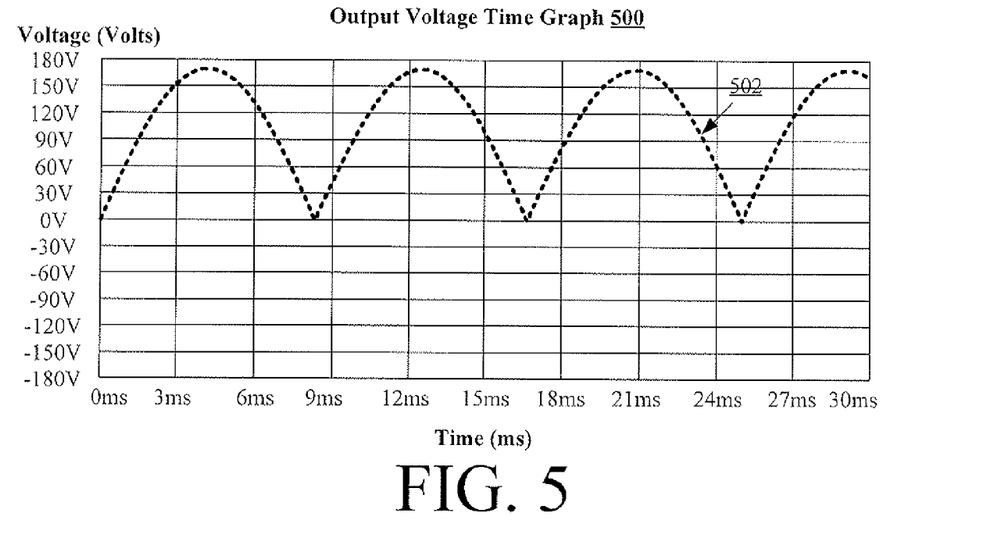
FIG. 5 is an output voltage time graph showing an exemplary output voltage waveform of the transistor active bridge circuit of FIG. 1.

A transistor active bridge circuit 100 is shown in FIG. 1. The transistor active bridge circuit 100 shown in FIG. 1 is useful for a variety of purposes, including rectification of domestic AC mains (for example, 120V, 60 Hz) and/or foreign AC mains (for example, 230V, 50 Hz) with low power loss. As may be observed in FIG. 1, the transistor active bridge circuit 100 is supplied an AC voltage waveform. As such, the transistor active bridge circuit 100 is connectable to at least one AC voltage source 101 via two (2) input lines 103, 105. An input voltage time graph 400 showing an exemplary AC input voltage waveform 402 supplied to the transistor active bridge circuit 100 by AC voltage source 101 is provided in FIG. 4. The transistor active bridge circuit 100 is also connected between a pair of output lines 134, 136. The output lines 134, 136 can be connected across a load (not shown) so that the load (not shown) can be supplied a DC output voltage by the transistor active bridge circuit 100. An output voltage time graph 500 showing an exemplary output voltage waveform 502 of the transistor active bridge circuit 100 is provided in FIG. 5.

The transistor active bridge circuit 100 includes first and second field-effect transistors 102, 104 of a first channel type. The transistor active bridge circuit 100 also includes third and fourth field-effect transistors 106, 108 of a second channel type that is different from the first channel type. For example, the first and second field-effect transistors 102, 104 can be P-channel type whereas the third and fourth field-effect transistors 106, 108 can be N-channel type. According to an embodiment of the invention, each of the field-effect transistors can be enhancement mode devices. For example the P-channel type transistor can be model number IRFP9240, which is available from Fairchild Semiconductor, Inc. of San Jose, Calif. The N-channel device can be IRFP90N20D, which is also available from Fairchild Semiconductor, Inc. of San Jose, Calif. Still, it should be understood that embodiments of the present invention are not limited in this regard. Other types of field-effect transistors can also be selected depending upon the anticipated voltage and current handling requirements of the transistor active bridge circuit 100.

Figure 3A:
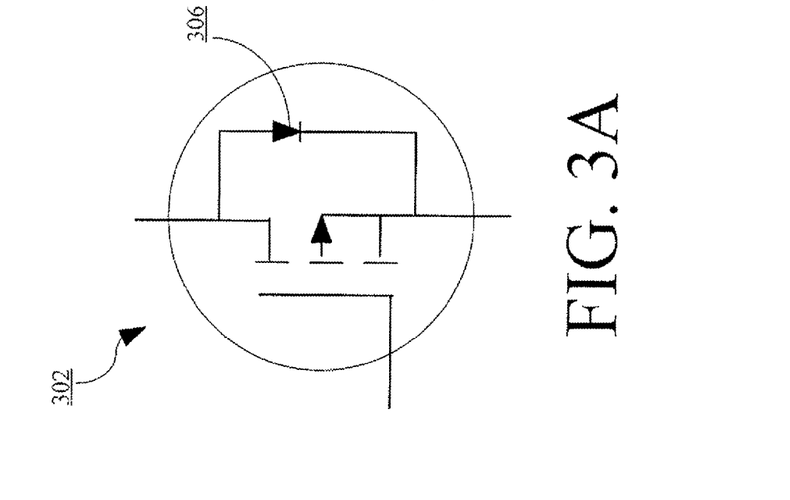
FIG. 3A is a schematic representation of a P-channel MOSFET having an intrinsic body diode.
Figure 3B:
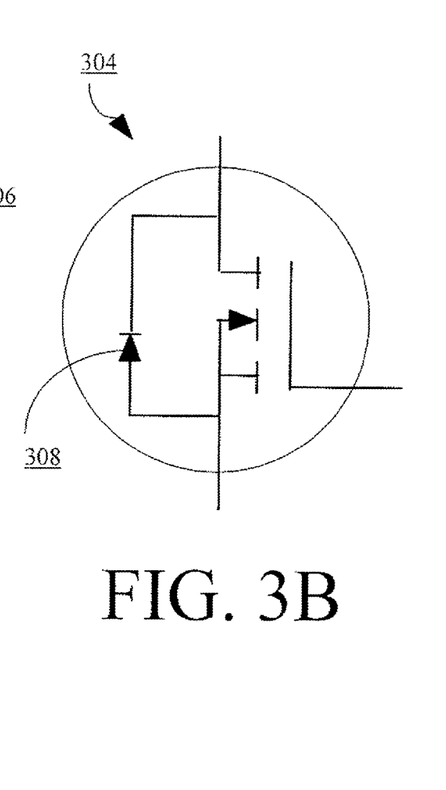
FIG. 3B is a schematic representation of an N-channel MOSFET having an intrinsic body diode.

As will be understood by those having ordinary skill in the art, each of the field-effect transistors 102, 104, 106, 108 will have three (3) terminals respectively defined as a source, a gate and a drain. With regard to the field-effect transistor 102, the source, gate and drain terminals are respectively identified with reference numbers 138, 139 and 140. With regard to the field-effect transistor 104, the source, gate and drain terminals are respectively identified with reference numbers 142, 143 and 144. The source, gate and drain terminals of the field-effect transistors 106 and 108 are respectively identified as 146, 147, 148 and 150, 151, 152. An electrical path can be provided from the source to the drain of each field-effect transistor 102, 104, 106, 108. This path is generally referred to herein as the source-drain path. Although not always shown in schematic illustrations, field-effect transistor devices, such as MOSFETs typically have an intrinsic body diode that results from the manner in which the devices are manufactured. This intrinsic body diode 306, 308 is illustrated in FIGS. 3A and 3B for a P-channel 302 and N-channel device 304.

Referring again to FIG. 1, it can be observed that a source-drain path of first field-effect transistor 102 is connected in series with a source-drain path of the second field-effect transistor 104. The series connected transistor pair 102, 104 form a first series transistor combination that is connected across the input lines 103, 105. A source-drain path of the third field-effect transistor 106 is connected in series with a source-drain path of the fourth field-effect transistor 108 to form a second series transistor combination connected across the input lines 103, 105.

The transistor active bridge circuit 100 can have an output defined by output lines 134, 136. A first one of the output lines 134 can be connected to the first series combination 102, 104 at an interconnection point 154 between the first and the second field-effect transistors 102, 104. A second one of the output lines 136 can be connected to the second series combination 106, 108 at an interconnection point 156 between the third and fourth field-effect transistors 106, 108.

A gate driver circuit 170, 172, 174, 176 is provided for each field-effect transistor 102, 104, 106, 108. An output terminal 1 of each gate driver circuit 170, 172, 174, 176 is connected to a gate 139, 143, 147, 151 of a respective field-effect transistor 102, 104, 106, 108. A terminal 2 of each gate driver circuit 170, 172, 174, 176 is connected to a respective one of the output lines 134, 136 and to a source 138, 142, 146, 150 of a respective field-effect transistor 102, 104, 106, 108. An input terminal 3 of each gate driver circuit 170, 172, 174, 176 is coupled to a voltage divider circuit (described below).

Each gate driver circuit 170, 172, 174, 176 is generally configured to supply a voltage to the gate 139, 143, 147, 151 of a respective field-effect transistor 102, 104, 106, 108 at certain times for switching the field-effect transistor to its "on" state or "off" state. The voltage applied to the gate 139, 143, 147, 151 of a respective field-effect transistor 102, 104, 106, 108 has an "on state" or "off state" voltage value (e.g., 8.2 volts or 12 volts) selected in accordance with a particular field-effect transistor 102, 104, 106, 108 application. Each gate driver circuit 170, 172, 174, 176 is also generally configured to stop supplying the voltage to the gate 139, 143, 147, 151 of a respective field-effect transistor 102, 104, 106, 108 at certain times for switching the field-effect transistor to its "on" state or "off" state. An exemplary embodiment of the gate driver circuits 170, 172 will be described in detail below in relation to FIG. 2A. Similarly, an exemplary embodiment of the gate driver circuits 174, 176 will be described in detail below in relation to FIG. 2B.

The transistor active bridge circuit 100 further includes a plurality of devices for ensuring that each of the field-effect transistors 102, 104, 106, 108 is switched to its "on" states and/or "off" states at desirable times. These devices can include, but are not limited to, voltage divider circuits. According to embodiments of the present invention, each of the voltage divider circuits can be comprised of a first resistor and a second resistor connected in series. However, embodiments of the present invention are not limited in this regard. Instead, those having ordinary skill in the art will appreciate that numerous different types of voltage dividers circuits are possible and can be used for the purposes as hereinafter described. The voltage divider circuit for the first field-effect transistor 102 can include first resistor 110 and second resistor 112. The voltage divider circuit for the second field-effect transistor 104 can include first resistor 114 and a second resistor 116. Similarly, the voltage divider circuit for the third and fourth field-effect transistors 106, 108 can include first resistors 118, 122 and second resistors 120, 124.

In FIG. 1, the first and second resistors are connected in series from a source of each field-effect transistor to one of the input lines 103, 105. For example, the resistor combination 110, 112 is connected to source 138 of field-effect transistor 102 to input line 105. The resistor combination 114, 116 is connected to source 142 of field-effect transistor 104 to input line 103. Each voltage divider advantageously provides a voltage tap 158, 160, 162, 164. For example, if a resistive voltage divider is used as shown in FIG. 1, then the voltage tap can be provided at a connection point between the first and second resistors. The voltage tap 158, 160, 162, 164 of each voltage divider circuit is connected to an input terminal 3 of a respective one of the gate drive circuits 170, 172, 174, 176. Consequently, the voltage tap 158, 160, 162, 164 advantageously provides a substantially reduced voltage output relative to the input voltage applied to the voltage divider circuit by AC voltage source 101. For example, the voltage tap 158, 160, 162, 164 of a voltage divider circuit 110/112, 114/116, 118/120, 122/124 can provide an output that is reduced by ten percent (10%) to ninety percent (90%) relative to the input voltage.

Notably, embodiments of the present invention are not limited to any particular range of voltage reduction by the voltage divider circuit 110/112, 114/116, 118/120, 122/124. The purpose of the voltage divider circuits 110/112, 114/116, 118/120, 122/124 is to permit a relatively larger range of input voltages to be applied across input lines 103, 105 without producing excessively high voltage levels between an input terminal 3 of each gate drive circuit 170, 172, 174, 176 and a source 138, 142, 146, 150 of each field-effect transistor 102, 104, 106, 108. However, the voltage divider circuits 110/112, 114/116, 118/120, 122/124 should still produce a voltage between each input terminal 3 of the gate drive circuits 170, 172, 174, 176 and a respective source 138, 142, 146, 150 that is of sufficient magnitude to indicate when a respective field-effect transistor 102, 104, 106, 108 is to be switched to its "on" state or its "off" state. For example, the first resistor 110, 114, 118, 122 can be selected to be about fifty kilo Ohms (50 kΩ) and the second resistor 112, 116, 120, 124 can be selected to be about four hundred kilo Ohms (400 kΩ). In this scenario, the transistor active bridge circuit 100 can be absent of optional voltage clamping circuits 126, 128, 130, 132 (described below). Still, those having ordinary skill in the art will appreciate that the present invention is not limited in this regard. A variety of other voltage divider values can and should be used depending upon the design criteria for input voltage range, current draw, and transistor specifications.

The optional voltage clamping circuits 126, 128, 130, 132 can be provided to ensure that the voltage applied to the input terminals 3 of the gate drive circuits 170, 172, 174, 176 do not become excessively large as the AC input voltage is increased. Any suitable voltage clamping circuit can be used for this purpose. For example, each of the voltage clamping circuits 126, 128, 130, 132 could be simply implemented as a zener diode that is connected in parallel with first resistor 110, 114, 118, 122 between the input terminal 3 of a respective gate drive circuit 170, 172, 174, 176 and the source 138, 142, 146, 150 of a respective field-effect transistor 102, 104, 106, 108.

The zener diodes 126, 128, 130, 132 can ensure that the voltages between the inputs terminals 3 of the gate drive circuits 170, 172, 174, 176 and source terminals 138, 142, 146, 150 of the field-effect transistors 102, 104, 106, 108 are limited. For example, the zener diodes 126, 128, 130, 132 can prevent the voltages between the inputs terminals 3 of the gate drive circuits 170, 172, 174, 176 and the source terminals 138, 142, 146, 150 of the field-effect transistors 102, 104, 106, 108 from exceeding a predetermined threshold voltage defined by the reverse breakdown voltage of the zener diodes 126, 128, 130, 132.

A further advantage of using a voltage clamping circuit 126, 128, 130, 132 as described herein is it allows an adequate voltage level to be developed between the input terminal 3 of a gate drive circuit 170, 172, 174, 176 and the source 138, 142, 146, 150, of a field-effect transistor 102, 104, 106, 108, even with relatively low input AC voltages across lines 103, 105. For example, each of the voltage divider circuits 110/112, 114/116, 118/120, 122/124 can be designed to allow a relatively large proportion of the input AC voltage (e.g., 70%) to appear at the respective voltage tap 158, 160, 162, 164. The larger proportion of voltage ensures that the gate drive circuits 170, 172, 174, 176 will selectively switch the field-effect transistors 102, 104, 106, 108 to their "on" states or "off" states, even with relatively low input voltages from AC voltage source 101. In order to ensure that this larger proportion of voltage does not damage the gate drive circuits 170, 172, 174, 176 when considerably higher input voltages are applied to the transistor active bridge circuit 100, the clamping circuit 126, 128, 130, 132 can clamp the output of the voltage divider circuit 110/112, 114/116, 118/120, 122/124 at a predetermined level.

Figures 2A, 2B:
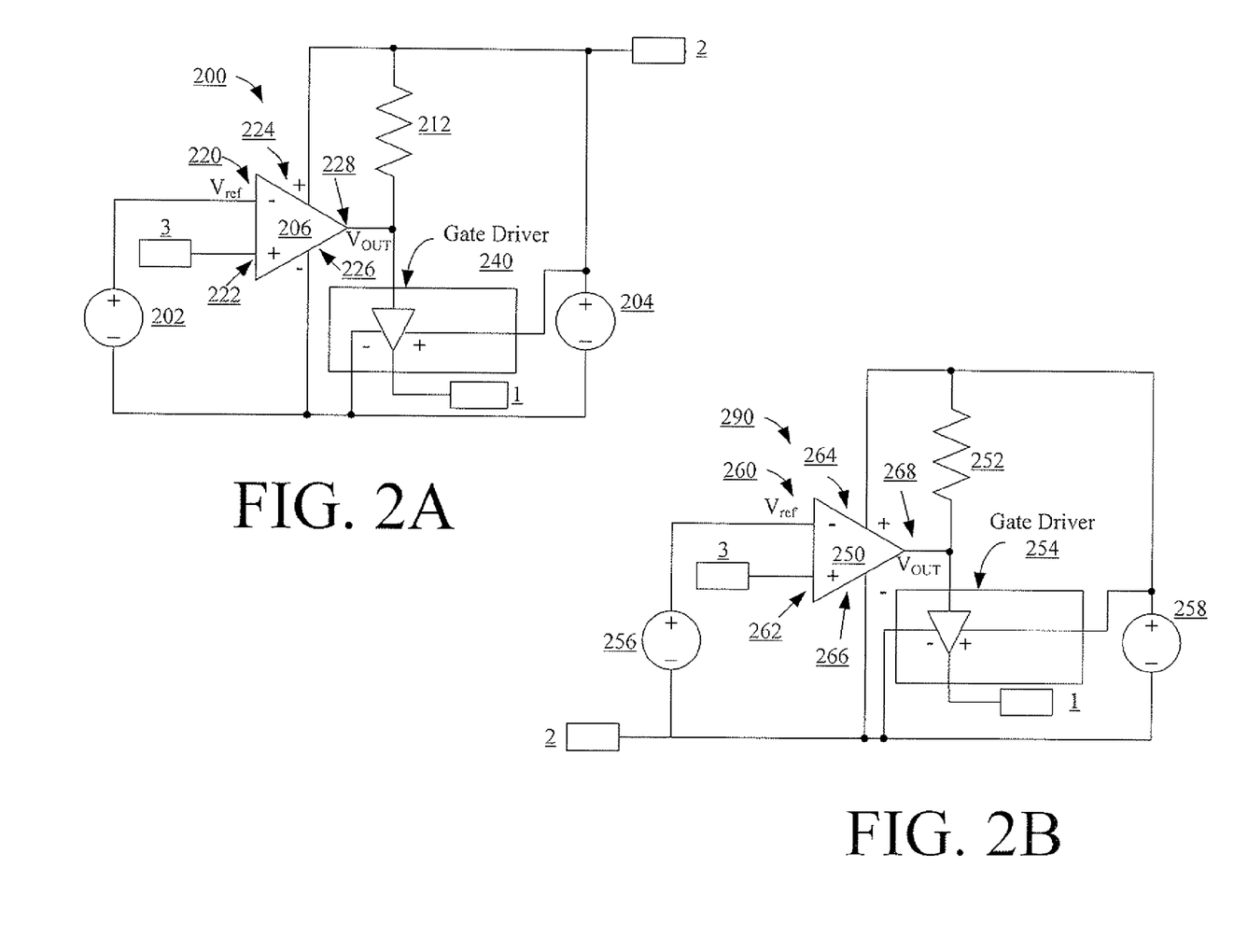
FIG. 2A is a schematic representation of an exemplary gate drive circuit for P-channel field-effect transistors.
FIG. 2B is a schematic representation of an exemplary gate drive circuit for N-channel field-effect transistors.

Referring now to FIG. 2A, there is provided a schematic illustration of an exemplary embodiment of the gate drive circuit 200 for P-channel field-effect transistors. Gate drive circuits 170, 172 of FIG. 1 can be the same as or substantially similar to the gate drive circuit 200. As such, the following description of the gate drive circuit 200 is sufficient for understanding the gate drive circuits 170, 172 of FIG. 1.

As shown in FIG. 2A, the gate drive circuit 200 includes a level detector circuit 206, a resistor 212 and an optional gate driver 240. The level detector circuit 206 is preferably a comparator circuit (for example, an open loop polarity indicator). Still, embodiments of the present invention are not limited in this regard. The level detector circuit 206 can be comprised of any voltage comparator circuit known in the art, provided that it has suitable specifications for a particular transistor active bridge circuit application.

Referring again to FIG. 2A, the level detector circuit 206 is comprised of an inverting input terminal 220, a non-inverting input terminal 222, a positive power supply terminal 224, a negative power supply terminal 226 and an output terminal 228. The inverting input terminal 220 is electrically coupled to a reference voltage source 202. The reference voltage source 202 is configured to supply a reference voltage ($V_{ref}$) to the level detector circuit 206. The reference voltage $V_{ref}$ can be selected to have any value (e.g., 7 Volts) in accordance with a particular transistor active bridge circuit application. The non-inverting input terminal 222 can be electrically coupled to a voltage tap (e.g., the voltage tap 158 shown in FIG. 1) of a voltage divider circuit (e.g., the voltage divider circuit 110/112 shown in FIG. 1).

As shown in FIG. 2A, the positive power supply terminal 224 is coupled to a positive terminal of a power supply 204. The negative power supply terminal 226 is coupled to a negative terminal of the power supply 204. As such, an input power supply voltage (e.g., 8.2 Volts) is coupled directly across the positive power supply terminal 224 and the negative power supply terminal 226 of the level detector circuit 206. The output voltage ($V_{OUT}$) of the level detector circuit 206 is forced to either the level detector circuit's positive saturation level or negative saturation level. For example, if a voltage at the non-inverting input terminal 222 is more positive than a voltage of the inverting input terminal 220, then the output voltage $V_{OUT}$ is forced to the level detector circuit's positive saturation level (i.e., the value of the input power supply voltage). Alternatively, if a voltage at the non-inverting input terminal 222 is less positive than a voltage at the inverting input terminal 220, then the output voltage $V_{OUT}$ is forced to the level detector circuit's negative saturation level (i.e., 0 Volts).

The output voltage $V_{OUT}$ of the gate drive circuit 200 is communicated from the level detector circuit 206 to the optional gate driver 240 or a gate (e.g., gate 139 shown in FIG. 1) of a P-channel field-effect transistor (e.g., the field-effect transistor 102 shown in FIG. 1). If the output voltage $V_{OUT}$ is forced to the level detector circuit's positive saturation level, then the P-channel field-effect transistor (e.g., the field-effect transistor 102 shown in FIG. 1) is switched to its "off" state. In contrast, if the output voltage $V_{OUT}$ is forced to the level detector circuit's negative saturation level, then the P-channel field-effect transistor (e.g., the field-effect transistor 102 shown in FIG. 1) is switched to its "on" state.

Gate drivers are well known to those having ordinary skill in the art, and therefore will not be described in detail herein. However, it should be understood that the gate driver 240 is generally configured to drive the P-channel first field-effect transistor (e.g., the field-effect transistor 102 shown in FIG. 1) in "on/off" state switching applications by supplying a voltage having an "on state" or an "off state" voltage value to the gate (e.g., gate 139 shown in FIG. 1) of the field-effect transistor (e.g., the field-effect transistor 102 shown in FIG. 1). According to embodiments of the present invention, the gate driver 240 can include, but is not limited to, a gate driver having a part number FAN3122 available from Fairchild Semiconductor Corporation of San Jose, Calif.

Figure 6:
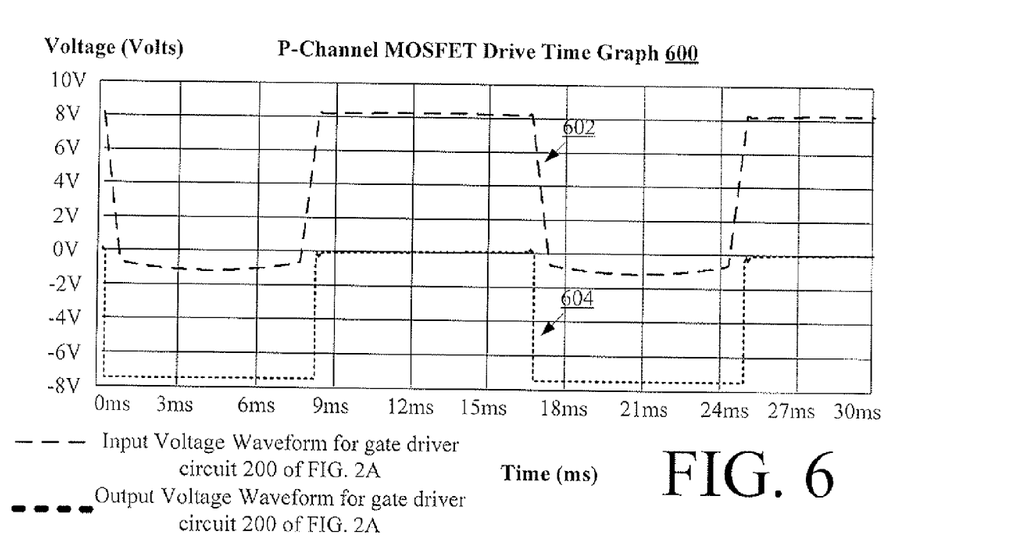
FIG. 6 is a P-channel MOSFET drive time graph showing a voltage waveform supplied to a gate drive circuit of FIG. 2A and an output voltage waveform of the gate drive circuit.

A P-channel MOSFET drive time graph 600 is provided in FIG. 6 that shows an exemplary input voltage waveform 602 supplied to the input terminal 3 of the gate drive circuit 200 and an exemplary output waveform 604 of the gate drive circuit 200. Notably, the input voltage waveform 602 is measured differentially across the load and not with respect to ground. Similarly, the output voltage waveforms 604 is measured differentially across the load and not with respect to ground. As shown in FIG. 6, the gate drive circuit 200 advantageously provides a transistor active bridge circuit 100 with decreased P-channel MOSFET turn "on" and "off" times.

Referring now to FIG. 2B, there is provided a schematic illustration of an exemplary embodiment of the gate drive circuit 290 for N-channel field-effect transistors. Gate drive circuits 174, 176 of FIG. 1 can be the same as or substantially similar to the gate drive circuit 290. As such, the following discussion of the gate drive circuit 290 is sufficient for understanding the gate drive circuits 174, 176 of FIG. 1.

As shown in FIG. 2B, the gate drive circuit 290 includes a level detector circuit 250, a resistor 252 and an optional gate driver 254. The level detector circuit 250 is preferably a comparator circuit (for example, an open loop polarity indicator). Still, embodiments of the present invention are not limited in this regard. The level detector circuit 250 can be comprised of any voltage comparator circuit known in the art, provided that it has suitable specifications for a particular bridge rectifier application.

The level detector circuit 250 is the same as or substantially similar to the level detector circuit 206 of FIG. 2A. As such, the description of the level detector circuit 206 provided above in relation to FIG. 2A is sufficient for understanding the level detector circuit 250. Similarly, the gate driver 254 is the same as or substantially similar to the gate driver 240 of FIG. 2A. Accordingly, the description of the gate driver 240 provided above in relation to FIG. 2A is also sufficient for understanding the gate driver 254. However, it should be understood that the gate driver 254 can include, but is not limited to, a buffer amplifier or a gate driver having a part number FAN3122 available from Fairchild Semiconductor Corporation of San Jose, Calif.

It should also be understood that the level detector circuit 250 is comprised of an inverting input terminal 260, a non-inverting input terminal 262, a positive power supply terminal 264, a negative power supply terminal 266 and an output terminal 268. The inverting input terminal 260 is electrically coupled to a reference voltage source 256. The reference voltage source 256 is configured to supply a reference voltage ($V_{ref}$) to the level detector circuit 250. The reference voltage $V_{ref}$ can be selected to have any value (e.g., 1.2 Volts) in accordance with a particular bridge rectifier application. The non-inverting input terminal 262 is electrically coupled to a voltage tap (e.g., the voltage tap 162 shown in FIG. 1) of the voltage divider circuit (e.g., the voltage divider circuit 118/120 shown in FIG. 1). The positive power supply terminal 264 is coupled to a positive terminal of a power supply 258. The negative power supply terminal 266 is coupled to a negative terminal of the power supply 258. As such, an input power supply voltage (e.g., 8.2 Volts) is coupled directly across the positive power supply terminal 264 and the negative power supply terminal 266 of the level detector circuit 250.

The output voltage ($V_{OUT}$) of the level detector circuit 250 is forced to either the level detector circuit's positive saturation level or negative saturation level based on whether the voltage at the non-inverting input terminal 262 is more or less positive than the reference voltage $V_{ref}$. If the output voltage $V_{OUT}$ is forced to the level detector circuit's positive saturation level, then the N-channel field-effect transistor (e.g., the field-effect transistor 106 shown in FIG. 1) is switched to its "on" state. In contrast, if the output voltage $V_{OUT}$ is forced to the level detector circuit's negative saturation level, then the N-channel field-effect transistor (e.g., the field-effect transistor 106 shown in FIG. 1) is switched to its "off" state.

Figure 7:
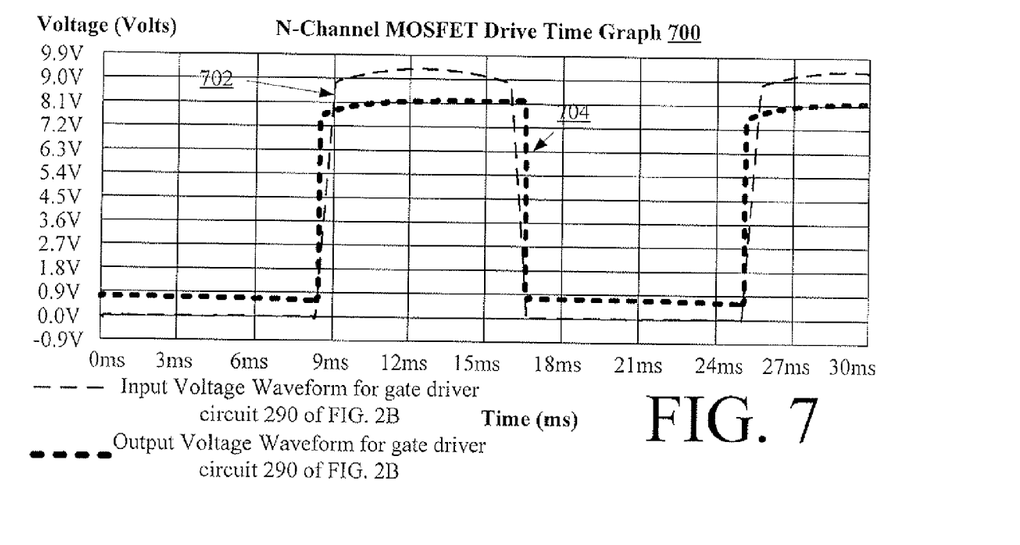
FIG. 7 is an N-channel MOSFET drive time graph showing a voltage waveform supplied to a gate drive circuit of FIG. 2B and an output voltage waveform of the gate drive circuit.

An N-channel MOSFET drive time graph 700 is provided in FIG. 7 that shows an exemplary input voltage waveform 702 supplied to the input terminal 3 of the gate drive circuit 290 and an exemplary output waveform 704 of the gate drive circuit 290. Notably, the input voltage waveform 702 is measured differentially across the load and not with respect to ground. Similarly, the output voltage waveforms 704 is measured differentially across the load and not with respect to ground. As shown in FIG. 7, the gate drive circuit 290 advantageously provides a transistor active bridge circuit 100 with decreased N-channel MOSFET turn "on" and "off" times.

The operation of the transistor active bridge circuit 100 will now be described in detail. When input line 103 is positive relative to input line 105, an intrinsic body diode associated with each of the field-effect transistors 102 and 108 will be forward biased and current will begin to flow between the drain 140, 152 and source 138, 150 of these field-effect transistors 102, 108. This will produce voltages at voltage taps 158 and 164 as current begins to flow through the voltage divider circuits 110/112, 122/124 associated with the respective field-effect transistors 102, 108. The voltage produced at the voltage taps 158, 164 can be used by each of the gate drive circuits 170, 176 for generating a gate control output signal for the respective field-effect transistor 102, 108. Thereafter, the gate drive circuits 170, 176 communicate the gate control output signal to the field-effect transistor 102, 108 for biasing the field-effect transistors 102, 108, thereby switching the field-effect transistors 102, 108 to their "on" states.

When switched to their "on" states, a relatively low resistance path is created between drain 140, 152 and source 138, 150 of each field-effect transistor 102, 108. The exact amount of this resistance will depend upon several factors, including the specified drain-source on state resistance of the field-effect transistors 102, 108. For example "on" state resistance values of between five tenths of a milli Ohm (0.5 mΩ) and ten Ohms (10Ω) are typical for such field-effect transistor devices. Generally P-channel devices have a slightly higher resistance as compared to N-channel devices. Once turned on, however, current will continue to flow between the drain 140, 152 and source 138, 150 of the field-effect transistors 102, 108 through the low resistance path, thereby eliminating the voltage drop associated with the body diode 306, 308. Consequently, if a load is connected across output lines 134, 136, then the voltage drop caused by the transistor active bridge circuit 100 can be considerably less than the typical diode drop associated with a conventional diode bridge circuit (e.g., circuit 1100 shown in FIG. 11). In this regard, it may be noted that in a conventional diode bridge circuit (e.g., circuit 1100 shown in FIG. 11), the output voltage drop will include two (2) diode drops. Accordingly, the voltage drop in a conventional diode bridge (e.g., circuit 1100 shown in FIG. 11) can be in the range from one and two tenths of a Volt (1.2 V) to one and six tenths of a Volt (1.6 V).

If the input voltage applied across input lines 103, 105 is sufficiently high, it will exceed a reverse breakdown voltage of zener diodes 126, 132. This will cause the zener diodes to clamp the voltage applied between the input terminal 3 of the gate drive circuits 170, 176 and source terminals 138, 150 of each field-effect transistor 102, 108. When the input voltage polarity is reversed, field-effect transistors 102, 108 will be switched to their "off" states, and the field-effect transistors 104, 106 will be switched to their "on" states in a manner similar to that described above.

Figure 8A:
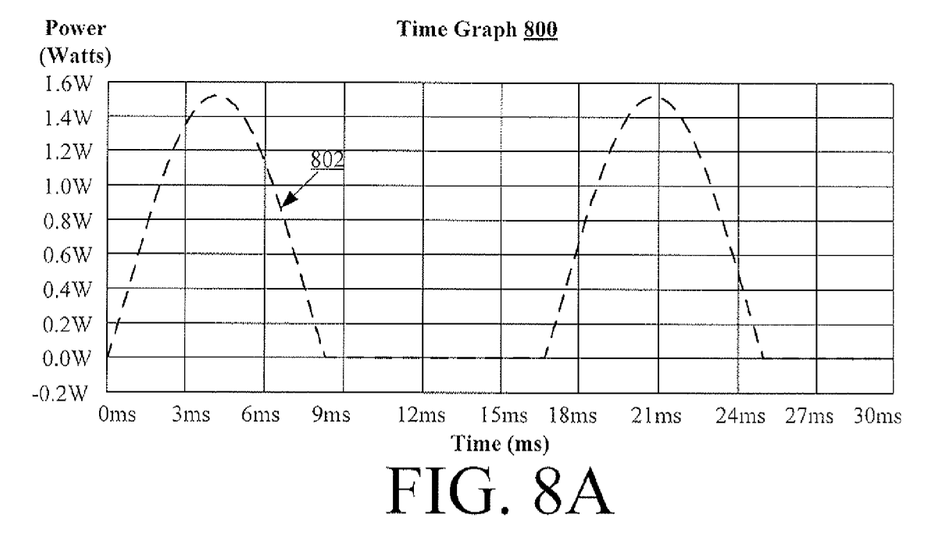
FIG. 8A is a time graph showing that a power dissipation waveform for a diode of a conventional diode bridge rectifier circuit.
Figure 8B:
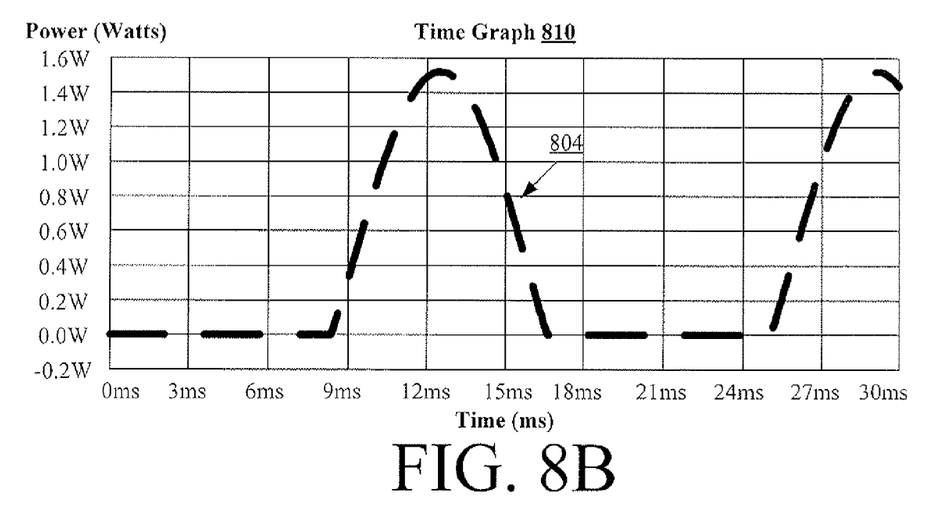
FIG. 8B is a time graph showing that a power dissipation waveform for a diode of a conventional diode bridge rectifier circuit.
Figure 8C:
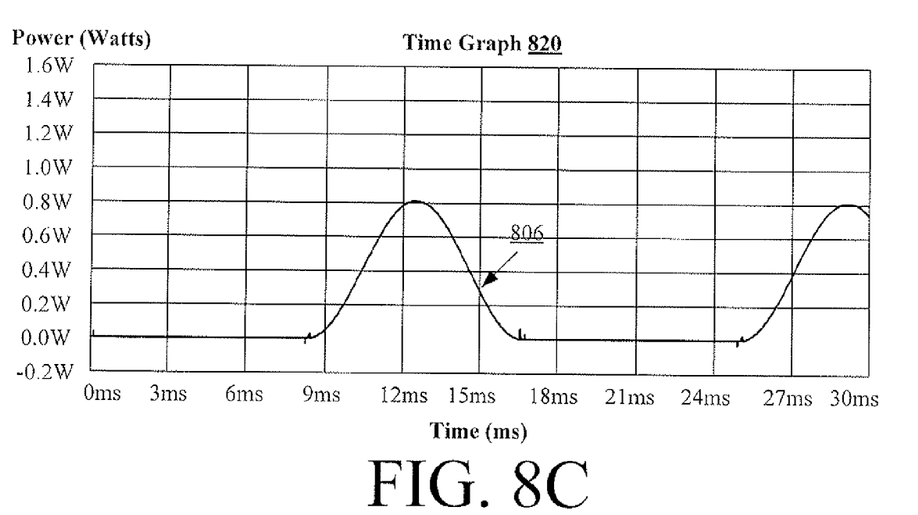
FIG. 8C is a time graph showing that a power dissipation waveform for a P-channel MOSFET of FIG. 1.
Figure 8D:
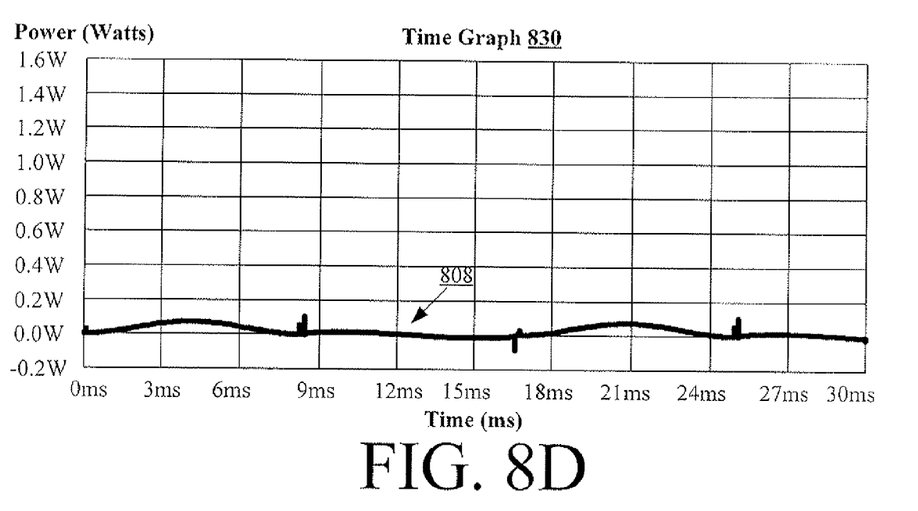
FIG. 8D is a time graph showing that a power dissipation waveform for an N-channel MOSFET of FIG. 1.
Figure 8E:
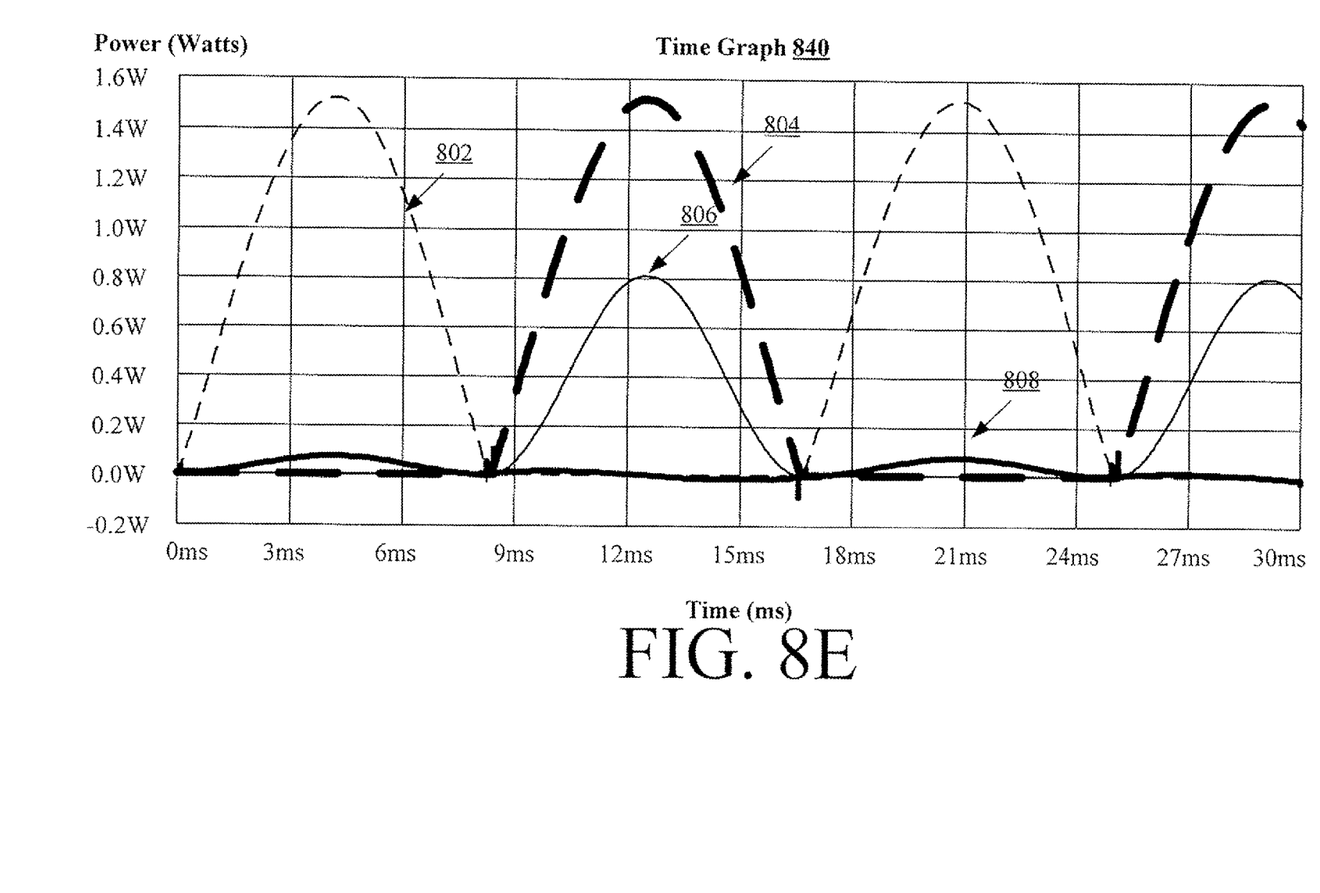
FIG. 8E is a time graph showing the power dissipation waveforms shown in FIGS. 8A-8D overlapping each other.

Referring now to FIGS. 8A-8E, there are provided a power dissipation time graphs 800, 810, 820, 830, 840 that are useful for understanding certain advantages of the present invention. Each of the time graphs 800, 810, 820, 830 shows a respective power dissipation waveform 802, 804, 806, 808. It should be noted that FIG. 8E shows power dissipation waveform 802, 804, 806, 808 of FIGS. 8A-8D overlapping each other. As shown in FIGS. 8A-8E, the first and second power dissipation waveforms 800, 810 represent power dissipated in a diode of a conventional bridge rectifier circuit 1100 with the load 109 connected thereto as shown in FIG. 11. A third power dissipation waveform 820 is a P-channel MOSFET of the transistor active bridge circuit 100 with a load (not shown in FIG. 1) connected thereto. The fourth power dissipation waveform 830 represents power dissipated in an N-channel MOSFET of the transistor active bridge circuit 100 with the load (not shown in FIG. 1) connected thereto.

As evidenced by the power dissipation time graph 840 of FIG. 8E, the amount of power dissipated in the field-effect transistors of the transistor active bridge circuit 100 is substantially less than the power dissipated in the diodes of the conventional transistor active bridge 1100. For example, the power dissipated in the P-channel and N-channel field-effect transistors of the transistor active bridge circuit 100 can be reduced by approximately seventy-five percent or more (>75%) as compared to the power dissipated in the diodes of the conventional transistor active bridge 1100 of FIG. 11. Notably, the transistor active bridge circuit 100 can be modified so as to decrease the amount of power dissipated in the P-channel and N-channel field-effect transistors than that shown in FIG. 8E. For example, the power dissipated in the transistor active bridge circuit 100 can be further reduced if two or more field-effect transistors are connected in parallel with the field-effect transistors 102, 104, 106, 108. The power dissipated in the transistor active bridge circuit 100 can also be further reduced if field-effect transistors with relatively low drain-to-source "on" state resistances $R_{DSon}$ are employed.

Figure 9:
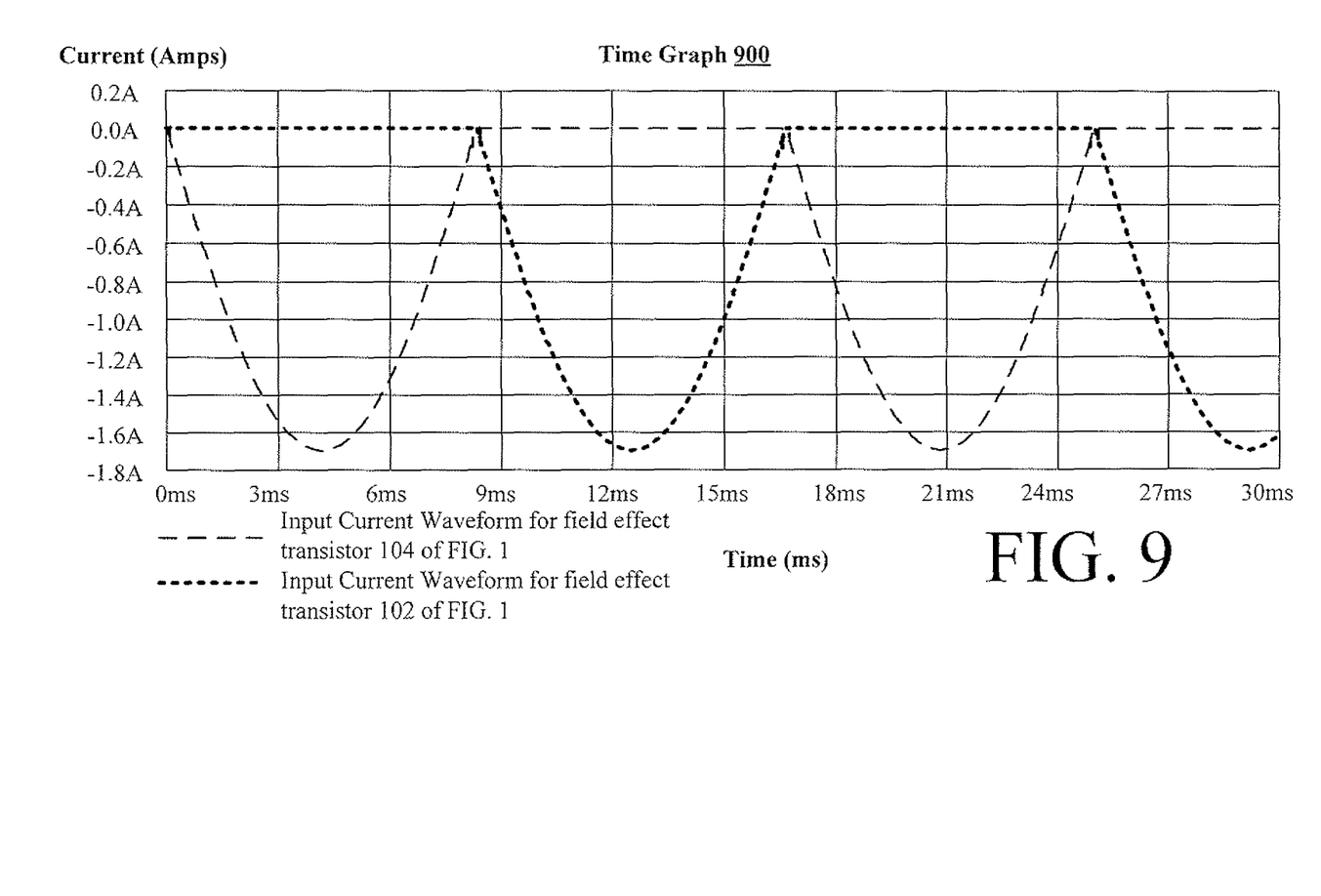
FIG. 9 is a time graph showing that shoot-through current is not created in an input current waveform as a result of the rectification of an AC mains signal by the transistor active bridge circuit shown in FIG. 1.
Figure 10:
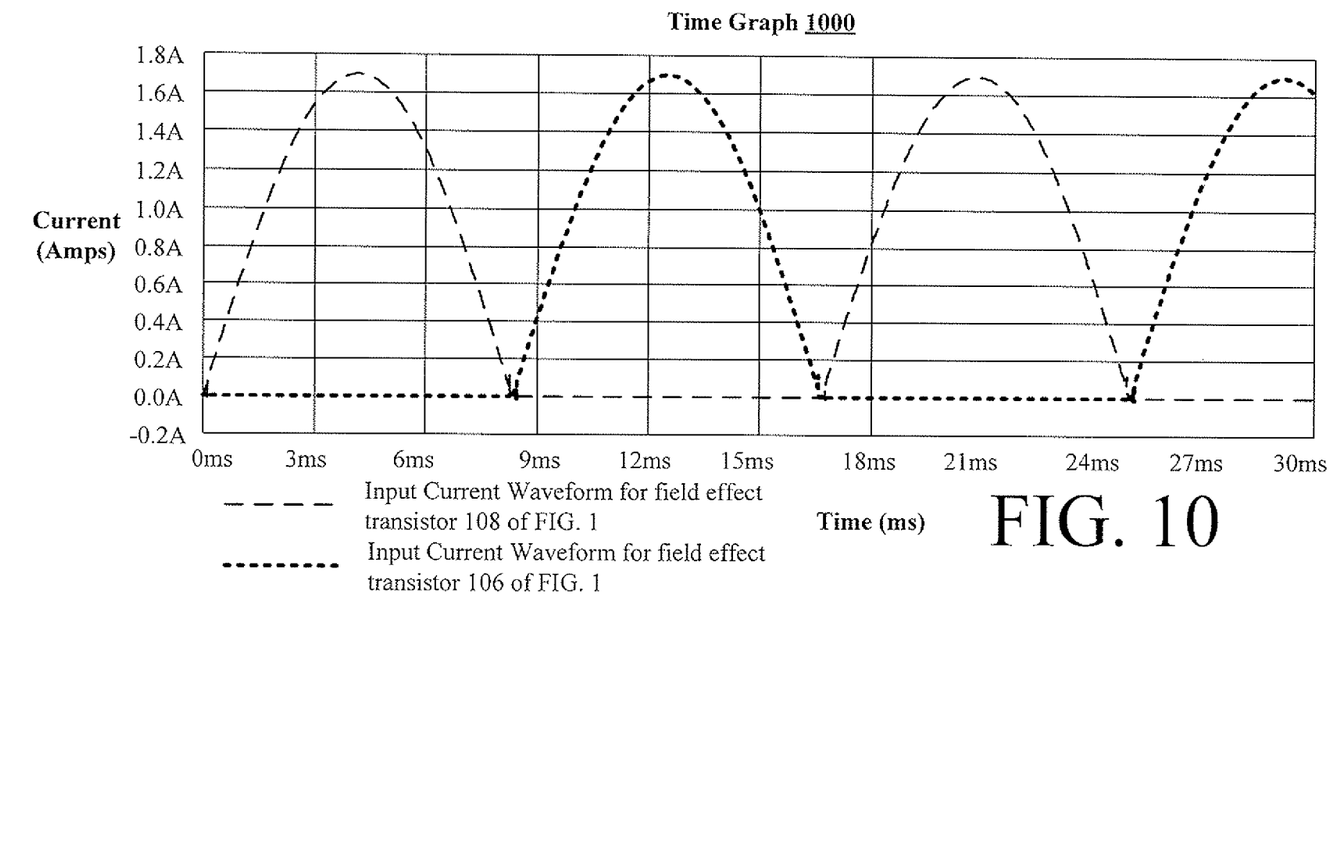
FIG. 10 is a time graph showing that shoot-through current is not created in an input current waveform as a result of the rectification of an AC mains signal by the transistor active bridge circuit shown in FIG. 1.

Referring now to FIGS. 9-10, there are provided time graphs 900, 1000 showing that shoot-through current is not created in an input current as a result of the rectification of an AC mains signal by the transistor active bridge circuit 100 shown in FIG. 1. As shown in FIG. 1, the field-effect transistors 102, 104 and 106, 108 are connected across the load (not shown in FIG. 1). If the field-effect transistors 102, 104 or 106, 108 are switched to their "on" states at the same time, then the AC voltage source 101 would be short circuited, and therefore a relatively large amount of current would flow through the field-effect transistors 102, 104 or 106, 108. However, since the field-effect transistors 102, 104 or 106, 108 do not conduct at the same time as shown in FIGS. 9-10, the AC voltage source 101 is never short circuited. As a result, shoot-through current is not created in an input current as a result of the rectification of an AC voltage waveform by the transistor active bridge circuit 100.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

A number of references are cited herein, the entire disclosures of which are incorporated herein, in their entirety, by reference for all purposes. Further, none of these references, regardless of how characterized above, is admitted as prior to the invention of the subject matter claimed herein.

I claim:

1. A discrete transistor active bridge circuit connectable between a pair of input lines and a pair of output lines, said discrete transistor active bridge circuit comprising:

first and second field-effect transistors of a first channel type, a source-drain path of said first field-effect transistor connected in series with a source-drain path of said second field-effect transistor to form a first series transistor combination connected across said pair of input lines;

third and fourth field-effect transistors of a second channel type, a source-drain path of said third field-effect transistor connected in series with a source-drain path of said fourth field-effect transistor to form a second series transistor combination connected across said pair of input lines;

said first, second, third and fourth field-effect transistors connected to convert an AC waveform to a DC waveform, said AC waveform applied to said discrete transistor active bridge circuit by a voltage source coupled to said pair of input lines;

a plurality of gate drive circuits configured to supply a voltage to gates of said first, second, third and fourth field-effect transistors for switching said field-effect transistors to their "on" states or "off" states at predetermined times, each of said plurality of gate drive circuits having an input terminal coupled to a source of a respective one of said field-effect transistors and an output terminal connected to a gate of said respective one of said field-effect transistors; and a voltage divider provided for each of said first, second, third and fourth field-effect transistors, said voltage divider comprised of a first resistor connected between a source of said respective one of said field-effect transistors and an input terminal of a respective one of said plurality of gate drive circuits and a second resistor connected in series with said first resistor from said source of said respective one of said field-effect transistors directly to a first input line of said input lines, where said first input line has a first voltage polarity opposite a second voltage polarity of a second input line of said input lines, and said second input line is directly coupled to a drain of said respective one of said field-effect transistors;

wherein each of said plurality of gate drive circuits includes a level detector circuit configured for providing a gate control output signal for each said field-effect transistor to selectively switch said field-effect transistor between said "on" state and said "off" state; and wherein each of said plurality of gate drive circuits further includes a resistor connected between an output terminal of said level detector circuit and a positive power supply terminal of said level detector circuit.

2. A discrete transistor active bridge circuit connectable between a pair of input lines and a pair of output lines, said discrete transistor active bridge circuit comprising:

first and second field-effect transistors of a first channel type, a source-drain path of said first field-effect transistor connected in series with a source-drain path of said second field-effect transistor to form a first series transistor combination connected across said pair of input lines;

third and fourth field-effect transistors of a second channel type, a source-drain path of said third field-effect transistor connected in series with a source-drain path of said fourth field-effect transistor to form a second series transistor combination connected across said pair of input lines;

said first, second, third and fourth field-effect transistors connected to convert an AC waveform to a DC waveform, said AC waveform applied to said discrete transistor active bridge circuit by a voltage source coupled to said pair of input lines;

a plurality of gate drive circuits configured to sense voltages applied on said plurality of input lines and supply a voltage to gates of said first, second, third and fourth field-effect transistors for switching said field-effect transistors to their "on" states or "off" states at certain times determined based on said sensed voltages, each of said plurality of gate drive circuits having a first terminal coupled to a source of a respective one of said field-effect transistors, a terminal connected to a gate of said respective one of said field-effect transistors, and a third terminal coupled to a respective voltage tap provided by a voltage divider; and said voltage divider provided for each of said first, second, third and fourth field-effect transistors, said voltage divider comprised of a first resistor connected between a source of said respective one of said field-effect transistors and said third terminal of a respective one of said plurality of gate drive circuits and a second resistor connected in series with said first resistor from said source of said respective one of said field-effect transistors directly to a first input line of said input lines, where said first input line has a first voltage polarity opposite a second voltage polarity of a second input line of said input lines, and said second input line is directly coupled to a drain of said respective one of said field-effect transistors;

wherein each of said plurality of gate drive circuits includes a level detector circuit configured for providing a gate control output signal for each said field-effect transistor to selectively switch said field-effect transistor between said "on" state and said "off" state; and wherein each of said plurality of gate drive circuits further includes a gate driver device excited by said level detector circuit and configured for driving said field-effect transistor by supplying a voltage having an "on state" voltage value to said gate of said field-effect transistor.

3. The discrete transistor active bridge circuit according to claim 2, wherein said gate driver device is a buffer amplifier.

* * * * *